United States Patent [19]

Hartman

[11] Patent Number: 5,100,571

[45] Date of Patent: Mar. 31, 1992

[54] ADDITIVE FOR ENGINE COOLING SYSTEM

[75] Inventor: Galen W. Hartman, Irving, Tex.

[73] Assignee: Royal Harvest, Inc., Buena Park, Calif.

[21] Appl. No.: 611,647

[22] Filed: Nov. 13, 1990

[51] Int. Cl.$^5$ .................. C02F 5/08; C09K 3/18; C23F 11/00; C23G 1/02

[52] U.S. Cl. .................. 252/75; 252/74; 252/76; 252/80; 252/87; 252/146; 252/389.51; 252/389.52

[58] Field of Search ............... 252/75, 389.51, 389.52, 252/74, 76, 389.24, 389.3, 389.31, 146, 80, 87

[56] References Cited

U.S. PATENT DOCUMENTS

| | | | |
|---|---|---|---|
| 2,529,177 | 11/1950 | Nieland | 422/17 |
| 2,992,185 | 7/1961 | Taylor | 252/76 |
| 3,959,166 | 5/1976 | Oberhofer et al. | 252/146 |
| 3,962,109 | 6/1976 | Oberhofer et al. | 252/146 |
| 4,260,504 | 4/1981 | Tucoulat et al. | 252/73 |
| 4,324,675 | 4/1982 | Barthold et al. | 252/79 |
| 4,333,850 | 6/1982 | Krueger | 252/389 A |
| 4,363,741 | 12/1982 | Gould | 252/142 |
| 4,392,972 | 7/1983 | Mohr et al. | 252/75 |
| 4,404,114 | 9/1983 | Mohr et al. | 252/75 |
| 4,448,702 | 5/1984 | Kaes | 252/70 |
| 4,514,315 | 4/1985 | Matulewicz | 252/75 |
| 4,569,779 | 2/1986 | Jabalee | 252/80 |
| 4,664,833 | 5/1987 | Cassin et al. | 252/75 |
| 4,711,735 | 12/1987 | Gulley | 252/75 |
| 4,806,259 | 2/1989 | Amjad | 252/80 |
| 4,810,406 | 3/1989 | Jabalee | 252/87 |
| 4,913,822 | 4/1990 | Chen et al. | 252/389.52 |

Primary Examiner—Paul Lieberman
Assistant Examiner—Christine A. Skane
Attorney, Agent, or Firm—Timmons & Kelly

[57] ABSTRACT

The additive of the invention can be used as an additive to a liquid cooling system or as a metal cleaning compound. The additive removes rust and other oxidized materials from the cooling system without having to be flushed from the system. The additive contains about 25 percent ortho phosphoric acid and about 1.5 percent zinc chloride. The additive also contains small amounts of ammonium bifluoride, octylphenoxypolyethyleneoxyethanol, dimethylpolysiloxane, and silicone emulsion. The carrier for the additive is preferably distilled water.

8 Claims, No Drawings

ADDITIVE FOR ENGINE COOLING SYSTEM

BACKGROUND OF THE INVENTION

1. Field of the Invention

This invention relates in general to radiator additives. In particular, the invention relates to an additive for cleaning an engine cooling system of rust, sludge, and other detrimental materials.

2. Description of the Prior Art

Automobile engines and other internal combustion engines are commonly cooled by liquid cooling systems. These cooling systems usually circulate a coolant comprising water and antifreeze through cooling passages in the engine. The coolant is then circulated through a radiator to dissipate the heat from the coolant.

A common problem in liquid cooling systems is rust. As the coolant is circulated through the engine and the radiator, rust forms and clogs the cooling system, reducing the efficiency of the system. In severe cases the rust may cause a leak in the cooling system.

The most common preventative measure is to flush the coolant from the cooling system periodically. This operation is time consuming, unpleasant, and relatively expensive. The old coolant must be replaced with new coolant, including new antifreeze.

Many chemical additives have been designed to be added to the coolant in order to retard the formation of rust and other detrimental materials. All of these additives have had disadvantages of varying degrees and type. For example, some prior art additives are effective only against organic or inorganic materials, but not both.

SUMMARY OF THE INVENTION

The additive of the invention can be added to the coolant in a liquid cooling system in order to provide several advantages. The additive cleans various metal surfaces by removing inorganic sludges and residues and well as organic residues.

The invention includes an 85 percent solution of ortho phosphoric acid, or a similar acid, in an amount of about 25 percent. The additive also contains about 1.5 percent of a zinc or lead chloride, preferably zinc chloride.

The additive also contains small amounts of several other materials. The ingredients of the additive are compatible and provide an effective additive for engine cooling systems.

DESCRIPTION OF THE PREFERRED EMBODIMENT

The cooling system additive of the invention comprises a liquid carrier that is miscible with the coolant in the system. Since most coolants are water miscible, the preferred carrier is distilled water. The water is approximately 70 to 75 percent by weight of the total additive. The preferred formulation of the additive has 72.17 percent water.

The additive also contains an ortho phosphoric acid in the amount of about 25 percent by weight. The acid could also be citric, gluconic, or tartaric acid. The preferred amount of acid is 25.00 percent, but the amount could range between 5.0 and 35.0 percent.

Another ingredient of the additive is zinc chloride. The additive has between 0.1 and 3.0 percent zinc chloride, preferably 1.50 percent. The zinc chloride could be replaced with lead oxide or lead chloride.

The additive also has relatively small amounts of several other materials. One of the additional materials is ammonium bifluoride, in the amount of between 0.05 and 1.50 percent, preferably 0.50 percent. Acceptable substitutes for the ammonium bifluoride include sodium fluoride and calcium fluoride.

Another material in the additive is octylphenoxypolyethyleneoxyethanol in the amount of between 0.1 and 1.50 percent by weight, preferably 0.50 percent. An alternative material is nonyloxypolyethyleneoxyethanol.

The additive also has dimethylpolysiloxane, in the amount of between 0.05 and 5.0 percent, preferably 0.30 percent. This material could be replaced with different silicone fluid.

Finally, the additive includes a silicone emulsion. The silicone emulsion is in the amount of between 0.005 and 2.0 percent. The preferred amount is 0.03 percent.

The cooling system additive of the invention has several advantages over the prior art. The additive cleans both inorganic and organic residues from the cooling system. Because of the metal cleaning properties of the additive, the additive can also be used as a metal cleaning compound at proper concentrations. The additive also extends the life of the antifreeze in the coolant. The additive increases the coefficient of thermal conductivity, the coolant enthalpy, and the coolant flow rates. The coolant temperature and viscosity are decreased. The additive also acts to lubricate the water pump and thermostat. Finally, the additive has antifoaming characteristics, and provides corrosion passivation and protection.

The invention has been shown in only a few embodiments. It should be apparent to those skilled in the art that the invention is not so limited, but is susceptible to various changes and modifications without departing from the spirit of the invention.

I claim:

1. An additive for an engine cooling system, the additive comprising:
    (a) a material selected from the group consisting of zinc chloride, lead oxide, and lead chloride, in an amount of between 0.1 and 3.0 percent by weight;
    (b) a material selected from the group consisting of ortho phosphoric acid, citric acid, gluconic acid, and tartaric acid in an amount of between 5.0 and 35.0 percent by weight;
    (c) a material selected from the group consisting of ammonium bifluoride, sodium fluoride, and calcium fluoride in an amount of between 0.05 and 1.50 percent by weight;
    (d) a material selected from the group consisting of octylphenoxypolyethyleneoxyethanol and nonyloxypolyethyleneoxyethanol in an amount of between 0.1 and 1.50 percent by weight;
    (e) a silicone fluid in an amount of between 0.05 and 5.0 percent by weight;
    (f) a selected amount of silicone emulsion in an amount of between 0.005 and 2.0 percent by weight; and
    (g) a selected amount of water.

2. An additive for an engine cooling system, as defined in claim 1, wherein the material in paragraph (a) of claim 1 comprises 1.50 percent by weight of the total additive.

3. An additive for an engine cooling system, as defined in claim 1, wherein the materiall in paragraph (b) of claim 1 comprises 25.00 percent by weight of the total additive.

4. An additive for an engine cooling system, as defined in claim 1, wherein the material in paragraph (c) of claim 1 comprises 0.50 percent by weight of the total additive.

5. An additive for an engine cooling system, as defined in claim 1, wherein the material in paragraph (d) of claim 1 comprises 0.50 percent by weight of the total additive.

6. An additive for an engine cooling system, as defined in claim 1, wherein the material in paragraph (e) of claim 1 comprises 0.30 percent by weight of the total additive.

7. An additive for an engine cooling system, as defined in claim 1, wherein the silicone emulsion in paragraph (f) of claim 1 comprises 0.03 percent by weight of the total additive.

8. An additive for an engine cooling system, as defined in claim 1, wherein the water in paragraph (g) of claim 1 comprises 72.17 percent by weight of the total additive.

* * * * *